United States Patent Office 3,051,762
Patented Aug. 28, 1962

3,051,762
PHENOL ALKYLATION PROCESS
Rudolf Stroh, Leverkusen-Bayerwerk, and Robert Seydel, Koln-Deilbruck, Germany, assignors to Farbenfabriken Bayer Aktiengesellschaft, Leverkusen, Germany, a corporation of Germany
No Drawing. Filed Oct. 15, 1958, Ser. No. 767,269
7 Claims. (Cl. 260—624)

This invention relates to a method of and a process for introducing organic groups onto the nuclear ring of phenols. More particularly, this invention relates to the introducing of alkyl groups onto the aromatic ring of phenols in an ortho or para position to the OH group.

It is known from the United States Patent No. 2,831,898 and the German Patent No. 944,014 that hydrocarbon groups can be introduced onto the nuclear ring of a phenol by reacting a phenol with an olefinic hydrocarbon in the presence of, as a catalyst, phenoxide forming metals, such as aluminium, magnesium, iron, calcium, sodium, lithium and others. The process is carried out at elevated temperatures and higher pressures. The reaction products thus obtained are mixtures consisting of several alkylated phenols, for example by using phenol and ethylene as initial materials, ortho ethyl phenol, 2,6-diethyl phenol and higher alkylated phenols are obtained. Beside this disadvantage the yields often are still unsatisfactory.

It is, therefore, an object of this invention to provide a process for introducing hydrocarbon groups onto the nuclear ring of phenols. It is a further object of this invention to provide a process for introducing groups onto the aromatic ring of phenols comprising reacting a phenol with an aliphatic hydrocarbon in the presence of phenoxide forming metals acting as catalysts. A further object of the present invention is to increase the yields of the main products thus obtained and to reduce the amounts of the by-products.

Further objects will appear hereinafter.

These objects are attained in accordance with the present invention by reacting an olefinic hydrocarbon with a phenol in the presence of metals capable of forming phenoxides at elevated temperature under higher pressure, in the presence of metal halides.

The olefines, which are suitable for use in this process, are mainly gaseous olefines, such as ethylene, propylene, butylene, isobutylene and others as described e.g. in the U.S. patent specification 2,831,898.

The phenols which according to the invention are reacted with the olefines are selected from the group consisting of unsubstituted phenols and substituted phenols with at least one unsubstituted reactive position, ortho or para to the OH-group, as for example phenol, alkyl-, cycloalkyl-, aryl phenols and others as described e.g. in the U.S. patent specification 2,831,898.

The metals capable of forming phenoxides are those metals, which are able to replace the hydrogen atom of the phenolic hydroxy group, such as for example zinc, aluminium, iron, magnesium, calcium, lithium, sodium and others as described e.g. in the U.S. patent specification 2,831,898.

Mixtures or alloys of these metals with one another or amalgams of these metals with small amounts of mercury can also be used.

As additional catalyst which is necessary for the process according to the invention metal halides are used. Suitable salts are for example: NaBr, NaI, $NH_4Cl$, KBr, KCl, KF, LiBr, $SiCl_4$, $MgCl_2$, $BaCl_2$, $ZnCl_2$, $PbCl_2$, $TiCl_4$, $FeCl_2$ and $CoCl_2$.

While the process of the invention can be carried out in some cases at room temperature or slightly elevated temperatures e.g. about 50° C., in many cases preferably somewhat higher temperatures are used for example up to about 400° C. A temperature range from about 50° C. to about 350° C. is in general suitable. Although the reaction may be effected at atmospheric pressure, it is preferred to use elevated pressure. Pressures in the range of 5–500 atmospheres are quite satisfactory for most purposes.

The metal catalysts capable of forming phenoxides are generally used in an amount of 0.1–5%, based on the weight of the phenol to be alkylated. The metal halide catalysts are added in an amount of 0.5 to 20% based on the phenols.

The additional employment of metal salts causes a notable increase in the yields of the main reaction products.

In the following examples the parts given are by weight if not otherwise stated.

Example 1

In a pressure vessel there are heated 200 parts of phenol and 2 parts of coarse aluminium powder. Under hydrogen evolution aluminium phenolate is formed. Then 10 parts sodium chloride powder are added, the mixture is heated to a temperature of 220° C. and propylene is pressed into the vessel thus producing a pressure of between 150–200 atmospheres. After 35 minutes 160 parts propylene are absorbed (1.8 mols propylene per 1 mol phenol).

If instead of the 10 parts of sodium chloride there is used 1 part of aluminium chloride a yield of 76.7% 2,6-diisopropyl phenol is obtained.

In the case of carrying out the reaction in the absence of coarse aluminium powder and by use of aluminium chloride or sodium chloride only as a catalyst the propylene absorption starts only at 340° C. The reaction product is inhomogeneous and a yield of less than 30% of 2,6-diisopropyl phenol is obtained only.

The advantage of the salt addition is to be seen in the following table:

| Catalyst | Reaction temperature, °C. | Propylene absorption | Yield in percent of the reaction product |
|---|---|---|---|
| (a) | 340–350 | 1:1; 0.12 mol | 30% 2,6-diisopropyl phenol. |
| (b) Al | 220 | 1:1; 0.78 mol | 60% 2,6-diisopropyl phenol. |
| (c) AlNNaCl | 220 | 1:1; 0.73 mol | 73.5% 2,6-diisopropyl phenol. |
| (d) $AlNAlCl_3$ | 200–220 | 1:2; 0.09 mol | 76.7% 2,6-diisopropyl phenol. |
| (e) NaCl | 350 | 1:1; 0.12 mol | 27% 2,6-diisopropyl phenol. |

Example 2

200 parts of phenol, 2 parts of aluminium turnings and 40 parts of sodium chloride are heated to 180–220° C. in a pressure vessel. The formed hydrogen is discharged. Then 120 parts of isobutylene are pressed into the vessel by means of a dosing pump thus producing a pressure of between 50 and 100 atmospheres. The reaction starts immediately. 2,4-di-tert.-butyl phenol is obtained as reaction product in a yield of 70% (M.P. 56° C.).

If a higher amount of isobutylene is introduced into the reaction vessel, 2,4,6-tri-tert.-butyl phenol is obtained with a yield of 76% (M.P. 130–131° C.).

Example 3

Carrying out the process as described in Example 2 but using para cresol instead of phenol, 2,6-di-tert.-butyl-4-cresol is obtained with a yield of 52% (M.P. 69–70° C.). Is the reaction stopped much earlier, 2-tert.-butyl-p-cresol is obtained (M.P. 54.5–55° C.).

Example 4

Carrying out the process as described in Example 3, but by use of hydroquinone, 2,5-di-tert.-butyl hydroquinone is obtained with a yield of 65% (M.P. 213–214° C.), respectively mono-tert.-butyl hydroquinone (M.P. 127–128° C.).

*Example 5*

300 parts phenol, 6 parts calcium chips and 3 parts calcium chloride (anhydrous) are heated to 340°–360° C. in a pressure vessel. The formed hydrogen is dischaged. Ethylene is pressed into the vessel producing a pressure of about 200–250 atmospheres as long as the gas is absorbed. The working up process yields an output of 33% of 2,6-diethyl phenol besides monoethyl phenol and higher alkylated phenols. If calcium metal is employed as a catalyst, only a yield of 25% of 2,6-diethyl phenol is obtained.

*Example 6*

300 parts phenol, 1 part of coarse aluminium powder and 6 parts of barium chloride (crystalline) are heated to 320–340° C. in a pressure vessel. Ethylene is pressed continuously on the reaction mixture producing a pressure of about 400–500 atmospheres until the decrease of pressure becomes remarkably smaller. The working up of the reaction mixture is done by fractional distillation. As main product 2,6-diethylphenol is obtained with a yield of 37.3% beside 10% of 2-ethyl phenol.

*Example 7*

In a pressure vessel 6000 parts of phenol, 90 parts of coarse aluminium powder and 300 parts of potassium chloride are heated to 200° C. for 1 to 2 hours while stirring whereby under hydrogen evolution aluminium phenolate is formed. The evolved hydrogen is not discharged and shows an excess pressure of 10–11 atmospheres in the autoclave. After cooling to 50° C., 7000 parts of isobutylene are pressed in during 4 hours while the temperature is kept between 61–62° C., and the internal pressure increases to an excess pressure of 20 atmospheres. It is subsequently stirred at a temperature of 62° C. until the pressure does not decrease any more (after 10 hours at 13 atmospheres).

The reaction product is worked up by distillation after aluminium phenolate and potassium chloride have been removed. 75% of the reaction product consists of 2,6-di-tert.-butyl phenol (M.P. 38° C.). Beside this only small amounts of ortho-tert.-butyl phenol (12%) and 2,4,6-tri-tert.-butyl phenol (10%) are formed.

If the process is carried out under the same conditions but in absence of potassium chloride, 58% 2,6-di-tert.-butyl phenol, 20% ortho-tert.-butyl phenol, 15% 2,4,6-tri-tert.-butyl phenol and 5% phenol are obtained.

*Example 8*

As described in Example 7, 6000 parts of ortho-cresol are caused to react with 3400 parts of isobutylene under addition of 60 parts of aluminium and 200 parts of lithium bromide. The working up process yields besides 10% of the ortho-cresol 85% of 2-methyl-6-tert.-pentyl phenol (M.P. 30–31° C.) without considerable amounts of by-products. Without addition of the alkali metal halide output of at most 78% of 2-methyl-6-tert.-butyl phenol besides at least 15% 2-methyl-4,6-di-tert.-butyl phenol can be reached.

The same favourable effects can be attained if the lithium bromide is replaced by the halides mentioned in the foregoing examples or other halides of metals of the first, second, fourth or eighth group of the periodic system, such as for example NaBr, NaI, $NH_4Cl$, KBr, KCl, KF, LiBr, $SiCl_4$, $MgCl_2$, $BaCl_2$, $ZnCl_2$, $PbCl_2$, $TiCl_4$, $FeCl_2$ and $CoCl_2$.

As many apparently widely different embodiments of this invention may be made without departing from the spirit and scope thereof, it is to be understood that the invention is not limited to the specific embodiments thereof except as defined in the appended claims.

What we claim is:

1. In the process for introducing an alkyl group onto at least one of the ortho and para positions of a phenol by reacting a phenol with an aliphatic olefin in the presence of a catalyst in the form of a phenoxide of a metal selected from the group consisting of zinc, aluminum, iron, magnesium, calcium, lithium, and sodium, the improvement essentially consisting of effecting the alkylation reaction in the additional presence of 0.5 to 20% by weight referred to the phenol of a halide of a metal selected from the group consisting of sodium, potassium, lithium, silicon, magnesium, barium, zinc, lead, titanium, iron, and cobalt.

2. The process of claim 1 wherein said metal is aluminum, said olefin is propylene, said phenol is phenol and said metal halide is sodium chloride.

3. The process of claim 1 wherein said metal is aluminum, said olefin is isobutylene, said phenol is hydroquinone, and said metal halide is sodium chloride.

4. The process of claim 1 wherein said metal is aluminum, said olefin is isobutylene, said phenol is para-cresol, and said metal halide is sodium chloride.

5. The process of claim 1 wherein said metal is calcium, said olefin is ethylene, said phenol is phenol and said metal halide is calcium chloride.

6. The process of claim 1 wherein said metal is aluminum, said olefin is isobutylene, said phenol is ortho-cresol, and said metal halide is lithium bromide.

7. The process of claim 1 wherein said metal is aluminum, said olefin is ethylene, said phenol is phenol, and said metal halide is barium chloride.

References Cited in the file of this patent

UNITED STATES PATENTS

| | | |
|---|---|---|
| 2,351,347 | Luten | June 13, 1944 |
| 2,831,898 | Ecke et al. | Apr. 22, 1958 |

OTHER REFERENCES

German application Ser. No. F14,023 IV b/12q printed December 8, 1955 (Kl. 12q, gr. 16) (3 pages spec., no drawing).

UNITED STATES PATENT OFFICE
CERTIFICATE OF CORRECTION

Patent No. 3,051,762                          August 28, 1962

Rudolf Stroh et al.

It is hereby certified that error appears in the above numbered patent requiring correction and that the said Letters Patent should read as corrected below.

Column 2, in the table, first column, under the heading "Catalyst", third line thereof, for "(c) AlNNaCl" read -- (c) Al + NaCl --; same column, fourth line thereof, for "(d) AlNaCl$_3$" read -- (d) Al + AlCl$_3$ --; column 3, line 8, for "dischaged" read -- discharged --.

Signed and sealed this 29th day of January 1963.

(SEAL)
Attest:

ERNEST W. SWIDER                          DAVID L. LADD
Attesting Officer                            Commissioner of Patents